United States Patent [19]

Rodgers

[11] Patent Number: 4,845,944
[45] Date of Patent: Jul. 11, 1989

[54] DUAL MODE GAS TURBINE POWER PLANT

[75] Inventor: Colin Rodgers, San Diego, Calif.

[73] Assignee: Sundstrand Corporation, Rockford, Ill.

[21] Appl. No.: 50,866

[22] Filed: May 18, 1987

[51] Int. Cl.$^4$ .............................. F02C 3/10; F02C 7/26
[52] U.S. Cl. ............................... 60/39.142; 60/39.161; 60/39.33
[58] Field of Search ............. 60/39.142, 39.15, 39.161, 60/39.33

[56] References Cited

U.S. PATENT DOCUMENTS

| | | |
|---|---|---|
| 2,095,991 | 10/1937 | Lysholm . |
| 2,529,973 | 11/1950 | Sedille et al. ..................... 60/39.142 |
| 2,622,392 | 12/1952 | Boestad et al. . |
| 2,748,566 | 6/1956 | Fletcher ........................... 60/39.161 |
| 3,813,874 | 6/1974 | Bruder et al. . |

*Primary Examiner*—Louis J. Casaregola
*Attorney, Agent, or Firm*—Wood, Dalton, Phillips, Mason & Rowe

[57] ABSTRACT

Poor fuel economy of a gas turbine power plant when operating at partial loads is avoided in a construction including a main power unit 10 with a low pressure turbine engine 40 and a high pressure turbine engine 42. In normal, full load operation, the engines 40 and 42 are connected so that combustion supporting gas is first compressed in the low pressure turbine engine 40 and subsequently further compressed in the high pressure turbine engine 42 before being directed to a combustor 90 to burn fuel which is then initially expanded in the high pressure turbine engine 42 and further expanded in the low pressure turbine engine 40. Fuel economy at partial load is obtained along with the generation of some power via the high pressure unit 42 by providing valves 76, 102 which may be operated to bypass the low pressure turbine engine 40 thereby reducing the air and corresponding consumption of fuel to that required to drive only the accessory unit 112.

8 Claims, 1 Drawing Sheet

DUAL MODE GAS TURBINE POWER PLANT

FIELD OF THE INVENTION

This invention relates to gas turbine power plants, and more specifically, to a gas turbine power plant capable of operating in two distinct modes.

BACKGROUND OF THE INVENTION

Many vehicles, as for example, lightweight, highly mobile armored military vehicles, require power plants having a high powered density. That is to say, in such vehicles, it is highly desirable that the power plant be capable of providing some maximum desired power output and yet occupy a minimum spacial volume.

As is well known, of known types of power plants, a simple cycle gas turbine holds a decided advantage in power density over other forms of engines. Furthermore, simple cycle gas turbines are easily started even in a wide variety of hostile environmental conditions, a characteristic that is highly desirable in a power plant for a military vehicle. Thus, it would seem that such simple cycle gas turbine engines would be ideally suited for this sort of application.

However, such is not presently the case. In particular, such engines suffer from poor fuel economy when operating at less than full load conditions. An armored military vehicle is frequently required to spend long periods of operation in a so-called in a "silent watch" mode wherein high loading on the power unit is not required but where partial loading is present due to the need to operate, for example, electronic and/or hydraulic systems. Because operation in such a mode occurs, as mentioned, over long periods of time, fuel economy is of real concern and the lack of it disqualifies an otherwise ideal form of engine from use in such vehicles.

The present invention is directed to overcoming one or more of the above problems.

SUMMARY OF THE INVENTION

It is the principal object of the invention to provide a new and improved gas turbine power plant. More specifically, it is an object of the invention to provide such a power plant that is capable of operating in two distinct modes including a high power mode and a partly loaded, low power or auxiliary power generating mode wherein operation can be achieved with good fuel economy.

An exemplary embodiment of the invention achieves the foregoing object in a construction including a high pressure turbine engine having a centrifugal compressor which in turn has an inlet and an outlet and which is coupled by a shaft to a turbine wheel. A nozzle structure is directed at the turbine wheel and means including a combustor interconnects the compressor outlet and the nozzle. The high pressure turbine has a gas outlet from the turbine wheel. An accessory power unit such as a generator or a pump is connected to the shaft of the high pressure turbine unit to be driven thereby.

The power plant further includes a low pressure turbine engine including a centrifugal compressor having an inlet and an outlet which is coupled to the inlet of the compressor of the high pressure turbine engine. The compressor is further coupled by a shaft to a second turbine wheel and a second nozzle structure is provided for directing gasses at the second turbine wheel. Means are provided to connect the gas outlet of the high pressure turbine engine to the second nozzle structure. The shafts of both engines are independently rotatable and a first valve is interposed between the high pressure turbine engine compressor inlet and the low pressure turbine engine compressor outlet for alternatively establishing a high power flow path therebetween or for establishing a bypass flow path between ambient and the high pressure engine compressor inlet in bypass relation to the low pressure turbine engine.

Also included is a second valve which is operable with the first valve and which is interposed between the high pressure turbine engine turbine wheel and the second nozzle of the low pressure turbine engine for alternatively establishing a high power flow path therebetween or for establishing a bypass flow path from the turbine wheel for the high pressure turbine engine to ambient and in bypass relation to the low pressure turbine engine.

As a consequence of this construction, the power plant may be operated in a high power mode utilizing both of the high power flow paths and both the high and low pressure turbine engines or in a partly loaded, fuel efficient, auxiliary power unit mode utilizing both of the bypass flow paths and only the high pressure turbine engine. Consequently, when operated in the latter mode, the power plant generates sufficient power to allow a vehicle to operate for a long period of time in a so-called "silent watch" mode and yet operate in such a mode with good fuel economy.

In a preferred embodiment of the invention, a power turbine is located downstream of the low pressure turbine engine and drives a main power unit such as a main generator, pump or transmission system. The power turbine has an output shaft and the main power unit is coupled to the output shaft so as to be driven by the power turbine when the high power flow paths are used and the low pressure turbine is not bypassed.

The invention contemplates that at least one of the valves utilized be a butterfly valve.

For mechanical design simplification, a preferred embodiment provides that the turbine engines be in side by side relation with their shafts in parallel relation Preferably, the output shaft of the power turbine and the shaft of the low pressure turbine engine are concentric.

The invention also contemplates that a starter means be coupled to the shaft of the high pressure turbine engine so that the power plant may be started with the valves establishing the bypass flow paths with a minimum expenditure of energy by starting only the high pressure turbine engine. Thereafter, the valves may be changed to establish the high power flow paths to initiate operation of the low pressure turbine engine when and as desired.

Other objects and advantages will become apparent from the following description taken in connection with the accompanying drawings.

DESCRIPTION OF THE DRAWINGS

The FIGURE is a somewhat schematic, sectional view of a gas turbine power plant capable of operating in two distinct modes and made according to the invention.

DESCRIPTION OF THE PREFERRED EMBODIMENT

Figure 1:
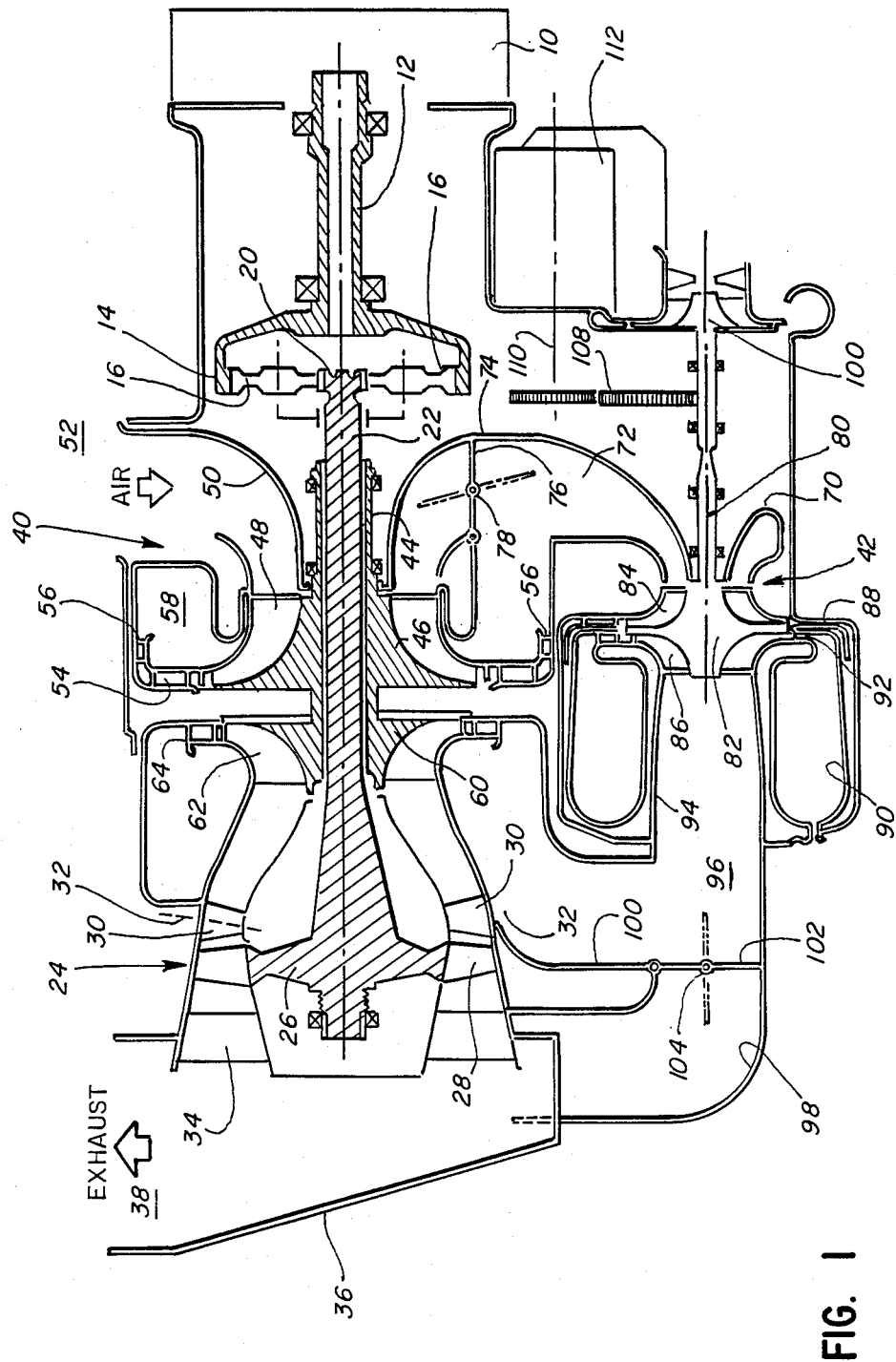

An exemplary embodiment of a gas turbine power plant made according to the invention is illustrated in the drawings and with reference thereto is seen to include a main power unit 10 which may be a main electrical generator, a transmission, a pump, or some similar device capable of providing power for use in the operation of systems that are intended to be driven by the power plant. The main power unit 10 is driven by a shaft 12 connected to a ring gear 14 which is meshed with planet gears 16 carried by a spider 18. The planet gears 16 are in turn meshed with a sun gear 20 on one end of an elongated shaft 22 which is driven by a power turbine, generally designated 24.

Where the power plant is intended to be used in a vehicle, by suitable means (not shown) the shaft 22 may be coupled to the propulsion system of such vehicle in addition to the main power unit 10.

The power turbine 24 may be an axial flow turbine having a turbine wheel 26 coupled to the shaft 22 and is provided with radially outward extending blades 28. Just upstream of the blades 26 are inlet guide vanes 30. As shown by the dotted lines 32, the guide vanes 30 are rotatably mounted so that their pitch may be varied to provide a variable inlet guide vane (VIGV) structure which can direct gasses against the blades 28 in a controlled fashion to obtain the desired output as well as to provide selective braking action if desired.

The power turbine 24 includes an exhaust outlet 34 which in turn is provided with a deflecting hood 36 to direct exhaust gasses to an outlet opening 38 whereby they are discharged to the ambient.

In addition to the power turbine 24, the power plant includes a low pressure turbine engine, generally designated 40, and a high pressure turbine engine, generally designated 42. The low pressure turbine engine 40 includes a shaft which is hollow and concentric about the shaft 22, being journalled thereon for relative rotation with respect thereto by any suitable bearing means. The shaft 44 mounts a radial discharge centrifugal compressor wheel 46 having blades 48. The blades 48 receive air from an annular inlet manifold 50 having an opening 52 directed to the ambient and compress such air and direct it radially outwardly into an annular diffuser 54. The diffuser 54 has an outlet end 56 which in turn directs the compressed air into an annular compressed air manifold 58.

The compressor wheel 46 is rotated by power applied to the shaft 44 by a turbine wheel 60 forming part of the low pressure turbine engine 40. The turbine wheel 60 includes blades 62 surrounded by an annular nozzle structure 64 which directs pressurized gas against the blades to impart rotative forces to the wheel 60. Gas exiting the vicinity of the turbine wheel 60 and the blades 62 is directed to the VIGV defined by the vanes 30 to thereafter drive the power turbine 24.

The high pressure turbine engine 42 includes an annular inlet manifold 70 connected by a duct 72 to the compressed air manifold 58 of the low pressure turbine engine 40. The duct 72 is also connected to the inlet manifold 50 at the location designated 74. At the location 74, a butterfly valve 76 pivotal about a pivot 78 is located. When the butterfly valve 76 is in the solid line position, the duct 72 and thus the inlet manifold 70 for the high pressure turbine engine 42 can only receive gas from the low pressure turbine engine compressor wheel 46. Conversely, when the butterfly valve 76 is in the dotted line position, the inlet manifold 70 of the high pressure turbine engine 42 is in direct fluid communication with the inlet opening 52 and the low pressure turbine engine 40 is bypassed.

The high pressure turbine engine 42 includes a cantilever journalled shaft 80 which in turn mounts a high pressure spool in the form of a so-called monorotor 82 having compressor blades 84 on one side and turbine blades 86 on the other.

The compressor blades 84 are radial discharge compressor blades and discharge into an annular diffuser 88.

The compressed gas emanating from the diffuser 88 is then fed to an annular combustor 90 which may be of conventional structure to be mixed with fuel to support combustion of the same. From the combustor 90, the hot gasses of combustion are directed to an annular nozzle 92 which directs such gas against the turbine blades 86 whereby the high pressure spool 82, and thus the shaft 80 are rotated.

Gasses leaving the turbine blades 86 enter an exhaust duct 94. The exhaust duct 94 extends to a junction at the location shown at 96 and splits into an exhaust duct 98 connected to the hood 36 and an exhaust duct 100 in fluid communication with the nozzle 64 of the low pressure turbine engine 40. At the junction 96, a butterfly valve 102 mounted on a pivot 104 is movable between the solid and dotted line positions illustrated. When in the solid position, gases exhausting the high pressure turbine engine 42 are directed to and through the nozzle 64 to impinge upon the blades 62 of the turbine wheel 60 of the low pressure turbine engine 40 and ultimately through the power turbine 24 to drive the same as well.

Conversely, when the butterfly valve 102 is in the dotted line position, gasses exhausting the high pressure turbine engine 42 are free to flow directly to the outlet 38, bypassing the low pressure turbine engine 40 and the power turbine 24 entirely.

The shaft 80 is coupled by any suitable means to a centrifugal load compressor 106 for any desired purposes and, by a power take off shown schematically at 108, to a shaft 110 which in turn drives an accessory power unit 112. The accessory power unit may be an electrical generator or a pump or both. Preferably, it includes a starter-generator for purposes to be seen.

In normal (high power) operation, the butterfly valves 76 and 102 are placed in the solid line position to establish high power flow paths. Ambient air is initially compressed in the low pressure turbine engine 40 and then further compressed in the compressor side of the high pressure turbine engine 42. It is then fed to the combustor 90 and used to support the combustion of sufficient fuel to provide gasses that, while expanding, sequentially drive the turbine of the high pressure turbine engine 42, the low pressure turbine engine 40 and the power turbine 24 before being exhausted to ambient. This mode of operation is utilized when there is a high power demand and it is necessary to drive the main power unit 10 and any other major power consuming systems associated with the power plant.

When a so-called "silent watch" mode of operation which requires the generation of a lesser amount of power is desired, the valves 76 and 102 are shifted to the dotted line positions to establish the bypass flow paths whereby the low pressure turbine 40 and the power turbine 24 are bypassed. Ambient air is drawn from the inlet 52 via the duct 72 into the compressor blades 84 of the high pressure turbine 42 so as to be compressed and delivered to the combustor 90. There, the air will be combined with a much smaller quantity of fuel to burn the same and generate only sufficient gas as to adequately drive the high pressure spool 82. The expanded gas can go directly to the ambient 38 via the duct 98.

The resulting driving of the high pressure spool 82 will be conveyed ultimately to the accessory power unit 112 to drive the same. Thus, all the power that is required in such a "silent watch" mode of operation is available and the quantity of fuel required to generate it is substantially reduced so that the fuel economy of the overall power plant allows one to take advantage of the high power density of a simple cycle turbine engine.

The invention also provides the ability to take advantage of the ease of starting of simple cycle turbine engines. In particular, in a starting mode, the valves 76 and 102 will be moved to the dotted line positions and a starter-generator forming part of the auxiliary power unit 112 cranked to rotate the shaft 80 and bring the monorotor 82 up to sufficient speed to allow the high pressure turbine engine to be started, that is, to self-sustaining speed. As will be apparent from the drawings, the mass of the rotating components of the high pressure turbine engine 42 is significantly smaller than the mass of the rotating components of the low pressure turbine engine 40. Thus, the energy required to bring the rotor speed of the high pressure turbine engine 42 up to a self sustaining value is much less than would be required to start a turbine engine of the nature of the low pressure turbine engine 40 alone. Consequently, minimal battery requirements for starting purposes attend the use of the power plant.

When it is necessary to switch to the high power mode from the "silent watch" mode or to otherwise initiate operation of the low pressure turbine engine 40 immediately after starting of the high pressure turbine engine 42, the valve 76 and 102 are switched back to their solid line positions and exhaust gas from the high pressure turbine engine 42 will begin to operate against the turbine wheel 60 of the low pressure turbine engine 40 to rotate the same thereby causing the low pressure turbine engine compressor wheel 46 to begin to deliver compressed air to the high pressure turbine engine 42 for further compression therein.

In this connection, the use of butterfly valves as the valves 76 and 102 at the locations indicated allow the valves to be actuated with minimal actuating force since gaseous pressure acting against a valve disc on one side of the pivot and tending to oppose the opening of such valve is offset by gas pressure operating against the disc on the opposite side of the pivot which encourages opening movement of the disc; and vice versa.

Another advantage of the invention resides in the ability to locate the shafts 20, 44 and 80, which are all independently rotatable, in generally side by side and parallel relation to minimize the volume of the power plant.

From the foregoing, it will be appreciated that a gas turbine engine made according to the invention and capable of operating in two distinct modes provides an optimum means of enabling the use of a power plant having a high power density and easy starting qualities in a use or environment that also requires good fuel economy even when operating at partial loads.

I claim:

1. A gas turbine power plant capable of operating in two distinct modes comprising:
    a high pressure turbine engine including a centrifugal compressor having an inlet and an outlet and coupled by a shaft to a turbine wheel, a nozzle structure directed at said turbine wheel and means including a combustor interconnecting said compressor outlet and said nozzle, said high pressure turbine having a gas outlet from said turbine wheel;
    an accessory power consuming unit such as a generator or a pump connected to said shaft to be driven by said high pressure engine;
    a low pressure turbine engine including a centrifugal compressor having an inlet and an outlet coupled to said inlet of said compressor of said high pressure turbine engine, and further coupled by a shaft to a second turbine wheel, and a second nozzle structure for directing gases at said second turbine wheel;
    a main power consuming unit coupled to said low pressure engine;
    means connecting said gas outlet of said high pressure turbine engine to said second nozzle structure;
    said shafts being independently rotatable;
    a first valve interposed between said high pressure turbine engine compressor inlet and said low pressure turbine engine compressor outlet for alternatively establishing a high power flow path therebetween or for establishing a bypass flow path between ambient and said high pressure turbine engine compressor inlet in bypass relation to said low pressure turbine engine; and
    a second valve operable with said first valve and interposed between said high pressure turbine engine turbine wheel and said low pressure turbine engine second nozzle for alternatively establishing a high power flow path therebetween or for establishing a bypass flow path from said high pressure turbine engine turbine wheel to ambient in bypass relation to said low pressure turbine engine;
    whereby said power plant may be operated in a high power mode utilizing both said high power flow paths and both said high and low pressure turbine engines or in a fuel efficient auxiliary power consuming unit mode utilizing both said bypass flow paths and only said high pressure turbine engine.

2. The gas turbine power plant of claim 1 further including a power turbine downstream of said low pressure turbine engine, an output shaft from said power turbine, said main power consuming unit being coupled to said output shaft.

3. The gas turbine power plant of claim 1 wherein at least one of said valves is a butterfly valve.

4. The gas turbine power plant of claim 1 wherein said turbine engines are in side by side relation with said shafts in parallel relationship.

5. A gas turbine power plant capable of operating in two distinct modes comprising:
    a high pressure turbine engine including a centrifugal compressor having an inlet and an outlet and coupled by a shaft to a turbine wheel, a nozzle structure directed at said turbine wheel and means including a combustor interconnecting said compressor outlet and said nozzle, said high pressure turbine having a gas outlet from said turbine wheel;
    an accessory power consuming unit such as a generator or a pump connected to said shaft to be driven by said high pressure turbine engine;
    a low pressure turbine engine including a centrifugal compressor having an inlet and an outlet coupled to said inlet of said compressor of said high pressure turbine engine, and further coupled by a shaft to a second turbine wheel, and a second nozzle structure for directing gasses at said second turbine wheel;

a main power consuming unit such as a generator or a pump coupled to said low pressure turbine engine;

means connecting said gas outlet of said high pressure turbine engine to said second nozzle structure;

a first valve interposed between said high pressure turbine engine compressor inlet and said low pressure turbine engine compressor outlet for alternatively establishing a high power flow path therebetween or for establishing a bypass flow path between ambient and said high pressure turbine engine compressor inlet in bypass relation to said low pressure turbine engine; and a second valve operable with said first valve and interposed between said high pressure turbine engine turbine wheel and said low pressure turbine engine second nozzle for alternatively establishing a high power flow path therebetween or for establishing a bypass flow path from said high pressure turbine engine turbine wheel to ambient in bypass relation to said low pressure turbine engine;

whereby said power plant may be operated in a high power mode utilizing both said high power flow paths and both said high and low pressure turbine engines or in a fuel efficient auxiliary power mode utilizing both said bypass flow paths and only said high pressure turbine engine.

6. The gas turbine power plant of claim 5 further including a power turbine having an output shaft and located to receive gas from said second turbine wheel, said main power consuming unit being coupled to said output shaft.

7. The gas turbine power plant of claim 6 wherein said output shaft and said low pressure turbine engine shaft are concentric.

8. The gas turbine power plant of claim 5 wherein said high pressure turbine engine has rotary components of lesser mass than those of said low pressure turbine engine and further including starter means coupled to said shaft of said high pressure turbine engine whereby said power plant may be started with said valves establishing said bypass flow paths with minimum expenditure of energy by starting said high pressure turbine engine and thereafter causing said valves to establish said high power flow paths to initiate operation of said low pressure turbine engine.

* * * * *